(12) United States Patent
Agrawal et al.

(10) Patent No.: US 12,574,397 B2
(45) Date of Patent: Mar. 10, 2026

(54) DETECTING AND MITIGATING SYSTEM ANOMALIES USING KNOWLEDGE GRAPHS

(71) Applicant: International Business Machines Corporation, Armonk, NY (US)

(72) Inventors: Bhavna Agrawal, Armonk, NY (US); Robert Jeffrey Baseman, Brewster, NY (US); Jeffrey Owen Kephart, Cortlandt Manor, NY (US); Anuradha Bhamidipaty, Yorktown Heights, NY (US); Elham Khabiri, Briarcliff Manor, NY (US); Yingjie Li, Chappaqua, NY (US); Srideepika Jayaraman, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 18/192,812

(22) Filed: Mar. 30, 2023

(65) Prior Publication Data

US 2024/0333739 A1 Oct. 3, 2024

(51) Int. Cl.
*H04L 9/40* (2022.01)
*H04L 41/0631* (2022.01)
(Continued)

(52) U.S. Cl.
CPC ...... *H04L 63/1425* (2013.01); *H04L 41/0631* (2013.01); *H04L 41/065* (2013.01); *H04L 41/16* (2013.01); *H04L 43/16* (2013.01)

(58) Field of Classification Search
CPC ............................ H04L 63/1425; H04L 41/16
See application file for complete search history.

(56) References Cited

U.S. PATENT DOCUMENTS 9,366,451 B2 6/2016 Guo
10,127,453 B2 11/2018 Verdejo
(Continued)

FOREIGN PATENT DOCUMENTS

CN 112085202 A 12/2020

OTHER PUBLICATIONS

Chhetri et al., "Knowledge Graph Based Hard Drive Failure Prediction", Sensors 2022, 22, 985, Jan. 27, 2022, 21 Pgs, <https://doi.org/10.3390/s22030985>.

(Continued)

*Primary Examiner* — Patrice L Winder
(74) *Attorney, Agent, or Firm* — David K. Mattheis

(57) ABSTRACT

Detecting and mitigating anomalous system behavior by providing a machine learning model comprising a knowledge graph depicting system entity relationships, and modeling behavioral correlations among system entities according to historical time-series data, receiving real-time time-series data for the system, detecting an anomalous system behavior in a system locale, according to the real-time time-series data, according to the machine learning model and multivariate sensor metrics, diagnosing the anomalous system behavior according to an upstream portion of the knowledge graph and a statistical behavior model for the system locale, and mitigating the anomalous behavior by deriving a recommended action according to the anomalous behavior and generating a work order to implement the recommended action.

20 Claims, 3 Drawing Sheets

200

(51) Int. Cl.
H04L 41/16 (2022.01)
H04L 43/16 (2022.01)

(56) References Cited

U.S. PATENT DOCUMENTS

| | | | | |
|---|---|---|---|---|
| 10,628,253 | B2 | 4/2020 | Sharma | |
| 10,635,094 | B2 | 4/2020 | Rosca | |
| 11,182,748 | B1 * | 11/2021 | Neckermann | G06N 20/00 |
| 11,228,505 | B1 * | 1/2022 | Wang | H04L 41/16 |
| 11,314,242 | B2 | 4/2022 | Sun | |
| 2010/0318641 | A1 * | 12/2010 | Bullard | H04L 43/16 |
| | | | | 370/328 |
| 2013/0198119 | A1 * | 8/2013 | Eberhardt, III | G06N 20/00 |
| | | | | 706/12 |
| 2014/0172371 | A1 * | 6/2014 | Zhu | G06Q 10/00 |
| | | | | 702/185 |
| 2016/0282821 | A1 * | 9/2016 | Chen | G06F 17/18 |
| 2018/0219888 | A1 * | 8/2018 | Apostolopoulos | |
| | | | | H04L 63/1425 |
| 2020/0019893 | A1 | 1/2020 | Lu | |
| 2020/0250062 | A1 * | 8/2020 | Arora | G06F 11/3006 |
| 2020/0252261 | A1 * | 8/2020 | Arora | H04L 43/0817 |
| 2020/0364128 | A1 * | 11/2020 | Vittal | G06F 9/45558 |
| 2020/0409339 | A1 * | 12/2020 | Arashanipalai | G06F 16/906 |
| 2022/0303291 | A1 * | 9/2022 | Baldini Das Neves | |
| | | | | H04L 63/1425 |
| 2023/0016199 | A1 * | 1/2023 | Jividen | G06N 20/00 |
| 2023/0069074 | A1 * | 3/2023 | Chen | G06N 3/08 |
| 2023/0102786 | A1 * | 3/2023 | Garapati | G06N 20/20 |
| | | | | 706/50 |
| 2023/0142028 | A1 * | 5/2023 | Cheng | H04L 43/16 |
| | | | | 709/224 |
| 2023/0153680 | A1 * | 5/2023 | Rohrkemper | G06N 20/00 |
| | | | | 706/12 |
| 2024/0305549 | A1 * | 9/2024 | Staszel | H04L 43/16 |
| 2025/0301328 | A1 * | 9/2025 | Abbaszadeh | H04L 41/145 |

OTHER PUBLICATIONS

Choudhary et al., "A Survey of Knowledge Graph Embedding and Their Applications", Indian Institute of Technology Delhi, 11 Pgs, arXiv:2107.07842v1 [cs.IR] Jul. 16, 2021, <https://arxiv.org/pdf/2107.07842.pdf>.

Jia et al., "Pattern Discovery and Anomaly Detection via Knowledge Graph", IEEE Xplore, 2018 21st International Conference on Information Fusion (Fusion), 8 Pgs, 978-0-9964527-7-9 © 2018 ISIF, Downloaded on Jan. 10, 2023.

Li et al., "A semantic model-based fault detection approach for building energy systems", ScienceDirect, Elsevier, Building and Environment 207 (2022) 108548, 16 Pgs, Nov. 11, 2021, <https://doi.org/10.1016/j.buildenv.2021.108548>.

Nesen et al, "Knowledge Graphs for Semantic-Aware Anomaly Detection in Video", 2020 IEEE Third International Conference on Artificial Intelligence and Knowledge Engineering (AIKE), 978-1-7281-8708-2/20 © 2020 IEEE DOI 10.1109/AIKE48582.2020.00018, 6 Pgs, Downloaded on Jan. 10, 2023, <https://ieeexplore.ieee.org/document/9355468>.

Schoenfisch et al., "Root cause analysis in IT infrastructures using ontologies and abduction in Markov Logic Networks", Science Direct, Elsevier Ltd, Information Systems , Nov. 12, 2017, 3 Pgs, <https://doi.org/10.1016/j.is.2017.11.003>.

Senarantne et al., "Unsupervised Anomaly Detection in Knowledge Graphs ", ACM ISBN 978-1-4503-9565-Jun. 21, 12, 5 Pgs, Dec. 6-8, 2021, <https://doi.org/10.1145/3502223.3502246>.

Setiawan et al., "GWAD: Greedy Workflow Graph Anomaly Detection Framework for System Traces", 2020 IEEE International Conference on Systems, Man, and Cybernetics (SMC), 7 Pgs, Oct. 11-14, 2020, 978-1-7281-8526-2/20 © 2020 IEEE.

Su et al., "A survey based on knowledge graph in fault diagnosis, analysis and prediction: key technologies and challenges", 2020 International Conference on Artificial Intelligence and Computer Engineering (ICAICE'20), 5 Pgs, Downloaded on Jan. 10, 2023, 978-1-7281-9146-1/20 © 2020 IEEE DOI 10.1109/ICAICE51518.2020.00096.

Su et al., "Robust Anomaly Detection for Multivariate Time Series through Stochastic Recurrent Neural Network", Aug. 4-8, 2019, Anchorage, AK, USA © 2019 Association for Computing Machinery, 10 Pgs, ACM ISBN 978-1-4503-6201-6/19/08, <https://doi.org/10.1145/3292500.3330672>.

Vaska et al., "Context-Dependent Anomaly Detection with Knowledge Graph Embedding Models", arXiv:2203.09354v2 [cs.LG] Mar. 19, 2022, 9 Pgs, <https://arxiv.org/pdf/2203.09354.pdf>.

Xiao et al., "SSP: Semantic Space Projection for Knowledge Graph Embedding with Text Descriptions", arXiv:1604.04835v3, [cs.CL] Jun. 17, 2017, 7 Pgs, <https://arxiv.org/pdf/1604.04835.pdf>.

Zhao et al., "Anomaly detection of unstructured big data via semantic analysis and dynamic knowledge graph construction", Apr. 12, 2021, 18 Pgs, https://www.spiedigitallibrary.org/terms-of-use>.

Zhong et al., "Aligning Knowledge and Text Embeddings by Entity Descriptions", Proceedings of the 2015 Conference on Empirical Methods in Natural Language Processing, 6 Pgs, Lisbon, Portugal, Sep. 17-21, 2015, c 2015 Association for Computational Linguistics.

Zhou et al., "Commonsense Knowledge Aware Conversation Generation with Graph Attention", Proceedings of the Twenty-Seventh International Joint Conference on Artificial Intelligence, 7 Pgs, Downloaded Jan. 25, 2023.

* cited by examiner

START

PROVIDE MONITORING MODEL 210

RECEIVE REAL-TIME DATA 220

DETECT ANOMALOUS BEHAVIOR 230

DIAGNOSE BEHAVIOR CAUSE 240

MITIGATE BEHAVIOR 250

200

DETECTING AND MITIGATING SYSTEM ANOMALIES USING KNOWLEDGE GRAPHS

FIELD OF THE INVENTION

The disclosure relates generally to the detection and mitigation of system behavioral anomalies. The invention relates particularly to the offline training of a system behavioral model and the runtime use of the model to detect and then mitigate anomalous behaviors.

BACKGROUND

Large systems may include functional nodes and sensors of differing types. Each such node and sensor may provide updated data continuously or at discrete intervals such that each node or sensor provides a time series of data which may be monitored and analyzed. Such analysis may include seeking correlations between time series data values and system activities, particularly anomalous system activities.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable detection, diagnosis and mitigation of anomalous system behavior.

Aspects of the invention disclose methods, systems and computer readable media associated with detecting and mitigating anomalous system behavior by providing a machine learning model comprising a knowledge graph (KG) depicting system entity relationships, and modeling behavioral correlations among system entities according to historical time-series data, receiving real-time time-series data for the system, detecting an anomalous system behavior in a system locale, according to the real-time time-series data, according to the machine learning model and multivariate sensor metrics, diagnosing the anomalous system behavior according to an upstream portion of the knowledge graph and a statistical behavior model for the system locale, and mitigating the anomalous behavior by deriving a recommended action according to the anomalous behavior and generating a work order to implement the recommended action.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
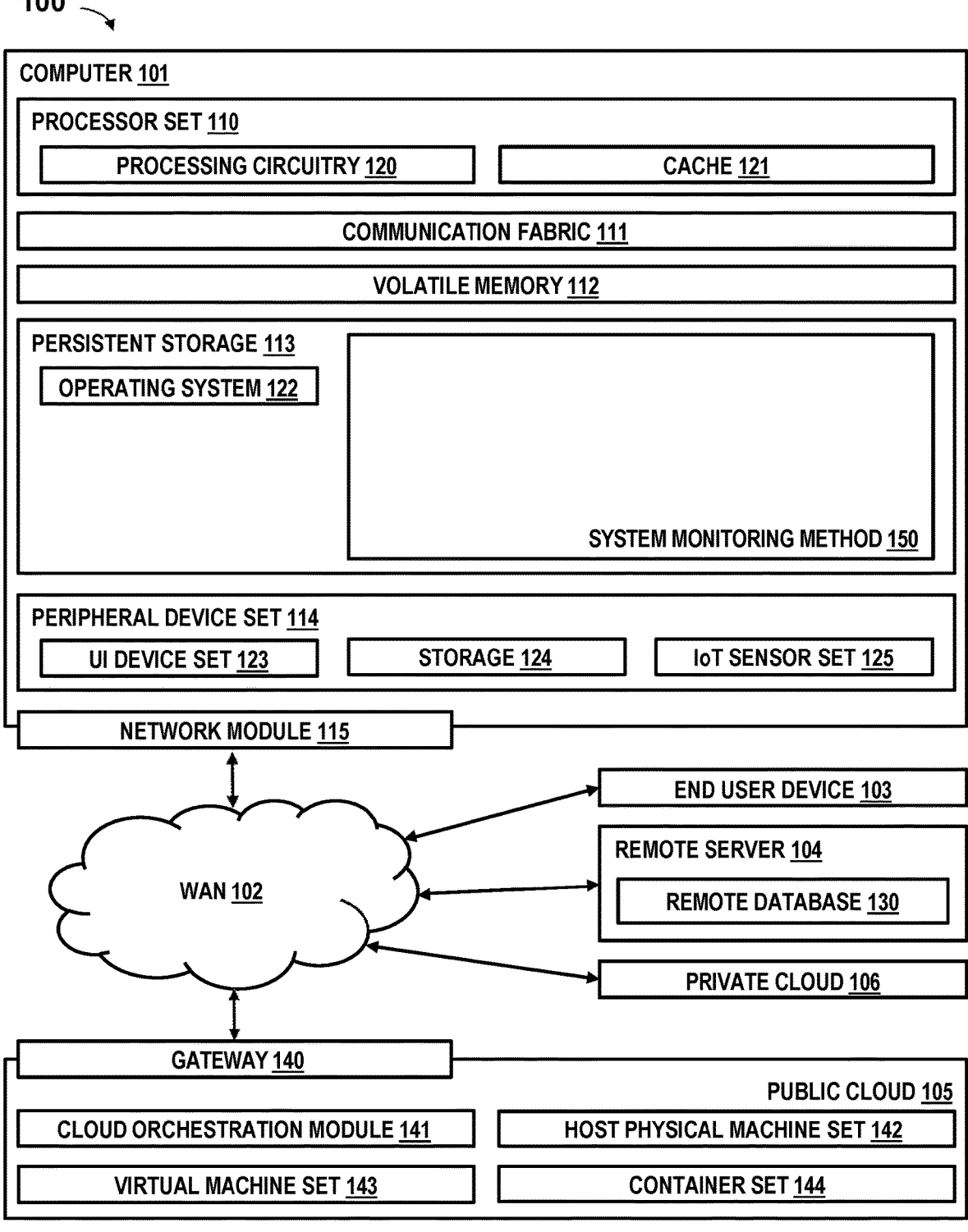
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

People responsible for managing large complex systems benefit from understanding the overall behavior of the system, and, whether there are any components or sets of components exhibiting abnormal behavior; If so: What is the nature and cause of the abnormal behavior? What actions would be likely to mitigate any observed abnormal behavior? Are there any components or sets of components that are currently operating acceptably, but which are predicted to behave abnormally in the future? And if so what actions would likely prevent that abnormal behavior?

Typically, sensors monitor individual system components, but inferring system-level behaviors and abnormalities from individual sensors is highly non-trivial.

As an example, a common method for identifying anomalous behavior includes steps wherein: Each sensor generates an individual sensor alert when its measurements satisfy certain pre-specified conditions, such as exceeding a threshold. The system sends the alert to a human operator via message or dashboard. The operator uses knowledge of the system's structure (possibly aided by system diagrams or live dashboards) to identify physically or logically proximate components. The operator checks the sensor readings of the identified proximate components, and possibly applies other diagnostic tools to those components to obtain extra additional pertinent information, such as turning on additional sensors or increasing data collection frequency of existing ones, and/or analyzing log files. The operator infers from sensor readings and other pertinent data the nature and cause of the anomaly, possibly iterating with the previous step. The operator determines, and then takes, an appropriate mitigative action. This largely manual approach is cognitively burdensome and error prone. The number of alarms and the mass and complexity of system interconnections can overwhelm a human operator's ability to prioritize and investigate alarms.

Consider the common industrial setting problem of seeking correlations among entities in a large system with thousands, or millions, of nodes. Suppose each sensor or function block measures or computes values periodically, for example, every second or every minute. Each generates a time-series of data. To discover pairwise correlations among a million time-series would require roughly half a trillion pairwise correlations to be computed. This is computationally infeasible, it is likely to generate many false correlations because, even for false positive correlations occur at the rate of just one per million pairs evaluated, there are likely to be about half a million false positives for such a system. Disclosed embodiments use known logical and physical relationships of a system of interacting entities to discover meaningful correlations among system entities and capture such correlations as behavioral models. Embodiments then utilize the models to enable the automated detection, diagnoses, and mitigation of anomalous system behaviors.

Aspects of the present invention relate generally to monitoring systems and, more particularly, to unsupervised dynamic anomaly detection and mitigation system. In embodiments, a monitoring system receives real-time system performance time-series data, detects one or more anomalous system behaviors associated with a system locale using a trained machine learning model based upon a semantic representation of a system or a system knowledge graph and multi-variate system element metrics, diagnoses the behavior according to system elements upstream from the locale, derives a recommended action for the behavior, and returns a work order to implement the recommended action. According to aspects of the invention, the monitoring system automatically and dynamically adjusts monitoring thresholds and frequencies in response to detected anomalies, which aids in determining root causes for the anomalies. In this manner, implementations of the invention learn and continually adjust the knowledge graph for the system in terms of element correlations and behavioral causations as well as monitoring thresholds and frequencies.

In accordance with aspects of the invention there is a method for automatically monitoring systems as well as detecting anomalous behaviors, diagnosing causes for such behaviors and initiating steps to mitigate the behaviors. The method comprising: providing a machine learning model comprising a knowledge graph depicting system entity relationships, and modeling behavioral correlations among system entities according to historical time-series data, receiving real-time time-series data for the system, detecting an anomalous system behavior in a system locale, according to the real-time time-series data, according to the machine learning model and multivariate sensor metrics, diagnosing the anomalous system behavior according to an upstream portion of the knowledge graph and a statistical behavior model for the system locale, deriving a recommended action according to the anomalous behavior and generating a work order to implement the recommendation.

Aspects of the invention provide an improvement in the technical field of monitoring systems. Conventional monitoring systems utilize static (i.e., unchanging) confidence thresholds for alerts and make use of significant human operator interventions in addressing anomalies in system performance. In many cases, users do not have data that tells them what a good alert threshold is and numerous false alarms occur and squander operator time and resources. As a result, the alert thresholds across large systems relate to single sensors and not to correlated events actually working as the underlying causes of aberrant system behaviors. In some cases, operators spend all their time addressing sensor-based alerts without having the time or means to identify correlations across system elements which act as the root cause of an issue. Implementations of the invention leverage knowledge of the physical and logical arrangement of the system to develop behavioral models including multi-variate behavioral models indicative of anomalous behavior, and utilize system knowledge graphs in diagnosing upstream root causes of anomalous behaviors. Over time, such embodied systems learn to identify early indicators of pending anomalies and to generate work orders to forestall system anomalies. This provides the improvement of reducing system anomalies by addressing root causes at an early stage, while at the same time avoiding the disadvantages associated with anomalous system behaviors.

Aspects of the invention also provide an improvement to computer functionality. In particular, implementations of the invention are directed to a specific improvement to the way monitoring systems operate, embodied in the continually adjusted multi-variate statistical detection, diagnoses, and mitigation models. In embodiments, the system adjusts the models monitoring thresholds and frequencies each time anomalous behavior is detected, as well as adjusting which system nodes are monitored, such that the monitoring thresholds and frequencies that are applied to the current real-time data differs from the monitoring thresholds and frequencies that were applied to the earlier time-series data. As a result of adjusting the monitoring thresholds and frequencies for the current real-time data based on the previous monitoring results, the system increases the likelihood that the system will provide early detection and mitigation of future anomalies. In this manner, embodiments of the invention affect how the monitoring system functions (i.e., the likelihood of providing early detection, diagnoses, and mitigation) as system operating time passes.

As an overview, a sensor-based monitoring system is an application executed on data processing hardware that monitors sensor output data and provides system alerts when such output data passes pre-determined threshold limits. The monitoring system receives inputs from various sources including input over a network, or other data, Data storage devices may store the received data. The system provides alerts to a human operator who must then interpret the sets of alerts and determine actions to be taken. Such an operator may respond in a prescribed manner without the benefits of correlating system events to identify underlying root causes provided disclosed embodiments correlation identifying multi-variate models.

In an embodiment, one or more components of the system can employ hardware and/or software to solve problems that are highly technical in nature (e.g., providing a machine learning model comprising a knowledge graph depicting system entity relationships, and modeling behavioral correlations among system entities according to historical time-series data, receiving real-time time-series data for the system, detecting an anomalous system behavior in a system locale, according to the real-time time-series data, according to the machine learning model and multivariate sensor metrics, diagnosing the anomalous system behavior according to an upstream portion of the knowledge graph and a statistical behavior model for the system locale, deriving a recommended action according to the anomalous behavior, generating a work order to implement the recommendation etc.). These solutions are not abstract and cannot be performed as a set of mental acts by a human due to the processing capabilities needed to facilitate detection and mitigation of anomalous system behavior. Further, some of the processes performed may be performed by a specialized computer for carrying out defined tasks related to the monitoring of system data for the detection and mitigation of anomalous system behavior. For example, a specialized computer can be employed to carry out tasks related to anomalous system behavior detection and mitigation or the like.

In an embodiment, systems and methods proceed from a knowledge graph of the target system. Such a knowledge graph includes physical and/or logical relationships between system elements. In an embodiment, the knowledge graph includes nodes representing system components and edges connecting nodes and representing the relationships between respective system components. If two entities (system components) are related through some physical or logical connection, the hierarchical structure of the knowledge graph should depict that the components have some sort of behavioral influence on one another relative to the depiction of the relationship of two randomly chosen system components.

Figure 3:
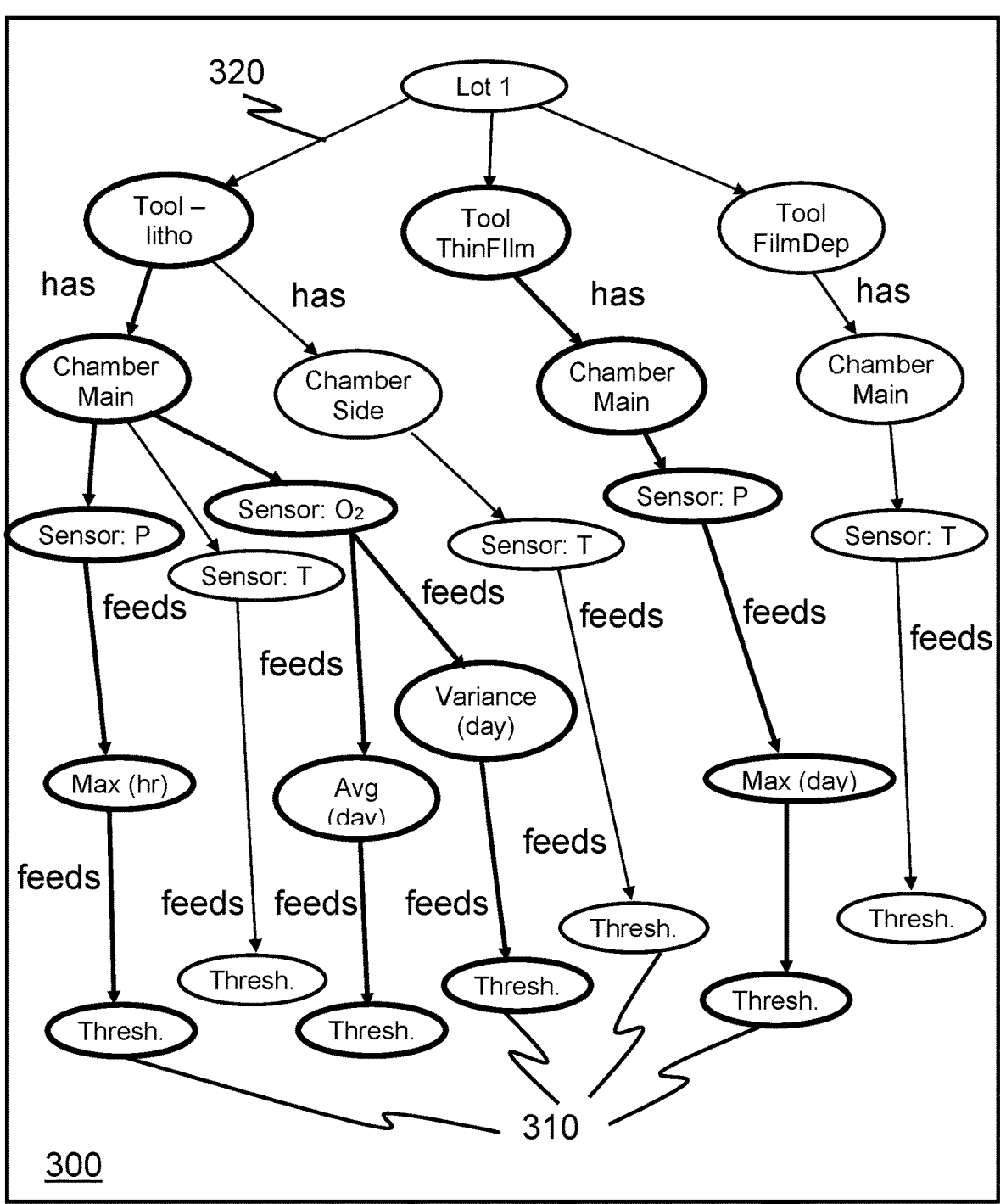
FIG. 3 depicts a knowledge graph for an exemplary system.

Entities and relationships may be derived from various sources, including knowledge of the physical and/or logical details of the system, e.g. from system documents or diagrams; data-driven discovery (such as numerical or via natural language processing) of the entities and/or relationships. Such information can help with building statistical models of the system by reducing the number of component correlations that need to be computed; discovering, diagnosing and mitigating anomalous behaviors by focusing attention on the most likely collections of entities that need scrutiny and analysis once alerts are generated. FIG. 3 depicts an exemplary knowledge graph of a system including nodes 310, and edges 320, illustrating the physical and logical entities of a system.

In an embodiment, the knowledge graph may be augmented through the identification of sub-graphs considered salient to the operational behaviors of the system. In an embodiment, salient sub-graphs include sub-graphs containing nodes considered to have stronger relationships than the relationships of typical neighboring nodes of the knowledge graph. Such sub-graphs may be identified or computed from the parent knowledge graph according to rules relating to component/node properties and/or constraints. Such rules may be provided by a subject matter expert familiar with the target system. In this embodiment, computed salient subgraphs indicate relationships having a higher than typical set of relationships between their included nodes.

In an embodiment, proceeding from the knowledge graph and salient subgraphs, systems and methods develop and train multi-variate statistical models through the use of the graphs and historical system performance time-series data. For knowledge graph nodes connected by directional edges, methods can infer causation from the directionality of the edges.

In an embodiment, systems methods utilize representational learning, through self-supervised encoding of multiple system nodes in a subgraph or other portion of the parent knowledge graph, into an intermediate representation learned from the historical time-series data values. In this embodiment, a series of related nodes, such as a salient sub-graph or other portion of the knowledge graph, may be encoded as an intermediate representation having a different dimensionality than the system reality. Such an encoding may be achieved utilizing historical time-series data identified as representing "normal" system behavior. After such an encoding has been generated for the subgraph, at runtime, method and system process real-time monitor the intermediate representation rather than each of the individual nodes in the subgraph. Systems and methods then interpret values from the intermediate representation deviating from those determined from the historical time-series data as indicative of anomalous system behavior.

At runtime, in an embodiment based upon such intermediate representations from representational learning, once system representations for subsystems are learned, they will form a graph of connections between the models, where each node will represent a model of all of its subgraph nodes at the leaf level. When these models are constantly generating 'anomaly scores' (i.e. directly proportional to the reconstruction error), and domain-dependent thresholds will generate anomaly alerts.

In this embodiment, the encoder-decoder models which generate the reconstruction errors (difference between the expected behavior and current value of the intermediate representation) contain 'attention' weights for each of the individual node values that are used in this model generation. The attention weights provide information on which node or group of nodes were more important in generating the intermediate representation, and thus the reconstruction error. This helps isolate the candidates for root cause identification. If the model is constantly monitored, and the same candidate is generated as contributing to the poor reconstruction, the node which causes this can be isolated for further scrutinous monitoring.

In this embodiment, this runtime alert can further be propagated to other neighboring nodes in the knowledge graph which are connected to the node which generated the alert, in order to perform higher levels of monitoring (for example by lowering the threshold to generate anomaly alerts), to generate some propagation information which can aid an operator in both isolating and mitigating the anomalous behavior, as well as provide a recommendation for what job role/operator will be best suited to mitigate this alert.

In an embodiment, systems and methods utilize Bayesian networks inferred from the knowledge graph or a portion thereof, using standard Bayesian techniques and historical time-series data values to derive the Bayesian network parameters.

In an embodiment, methods and systems utilize the knowledge graph and historical time-series data values to automatically determine monitoring thresholds for generating alerts associated with individual system nodes as well as defined system sub-graphs. In this embodiment, methods and systems consider user preferences for false positive/false negative occurrences.

Systems and method further analyze the behavior of the system utilizing the knowledge graph, subgraphs, and historical time-series data associated with past performance times of the system elements. In an embodiment, systems and methods derive sets of conditions, or multi-variate aggregations of sensor states which are indicative of anomalous system behavior.

In an embodiment, based upon the KG or subgraphs, systems and methods define proximal nodes as nodes within a defined inter-node distance relative to each other, or for small subgraphs, define the proximal nodes as the set of nodes of the subgraph. The systems and methods then analyze the sets of proximal node behaviors using the historical time-series data to identify nodes with correlations in their behaviors. The use of the sets of proximal nodes reduces the computational burden associated with identifying node-node behavior correlations. Having identified node-node behavior correlations using the KG and historical time-series data, systems and methods proceed with the analysis of real-time time-series data to detect anomalous system behaviors according to the multi-variate metrics and statistical models developed offline.

In an embodiment, in runtime mode, systems and methods proceed by computing multi-variate sensor metrics and comparing the computed values with the normal values for these metrics determined in the offline mode, monitoring of the metrics includes monitoring the locale within the system for each metric. Values outside normal limits trigger system alerts for those metrics, the alerts are logged and displayed through a user interface. In an embodiment, systems and methods further identify system components which are downstream from the locale giving rise to the alerts as well as displaying current metrics associated with the downstream components. In an embodiment, systems and methods utilize statistical models to evaluate the impact of the current anomaly upon other system components. In an embodiment, systems and methods temporarily increase the sensitivity, or alert threshold associated with the metrics for the downstream components.

In the event of detection of anomalous behavior at a system node or system locale, there is an elevated likelihood that downstream nodes from the anomalous node are or will soon be behaving anomalously. In an embodiment, systems and methods may take any or all of graphically displaying the behavior of nearby or downstream nodes, allowing an operator to determine if there is a current or looming issue with those nodes; automatically explore the nearby downstream nodes using the statistical models to identify any which are behaving anomalously and to then display the details of such anomalous behaviors; and proceed to diagnose and mitigate any additional anomalous behaviors detected.

In an embodiment, systems and methods assess the impact of a runtime anomaly by analyzing how the anomaly affects nodes which are physically or logically near the anomalous behaving node. In this embodiment, to understand the impact, once an anomaly A1 is discovered in one area, the neighboring nodes will operate on 'high alert' mode, i.e. systems and methods will lower their detection thresholds to detect any other anomalies which are caused in other subsystems. If the anomaly A1 gives rise to anomalies in other regions/subgraphs, the locality of the anomaly can be discovered by filtering the area (physical/logical) affected by this malfunctioning node or edge.

In this embodiment, if multiple such subgraphs or regions appear to be affected, then the anomaly A1 can be classified as urgent, if no other subgraphs or nodes generate anomalies even with lowered thresholds, then A1 can be classified as mild, and so on. If no other subsystems are affected, once an operator confirms that it is a false alarm, the data which caused the false alarm can be used in a feedback loop to retrain the model to understand that this representation is also under normal operation, so that the false alarm is not generated a second time.

In an embodiment, systems and methods diagnose system issues form anomalies by inputting the current anomaly details including the system locale of the anomaly and using the KG to identify upstream components having a physical or logical connection to the locale associated with the current anomaly. Systems and methods apply the developed statistical model to infer the likely causes of the anomalous behavior according to the predicted cause probabilities form the statistical models. In an embodiment, systems and methods convey the likely behavior causes along with the alerts for the anomaly through the display of the user interface.

In an embodiment, where a problem or other anomalous behavior is detected at some node in the system where edges of the knowledge graph are directed, there is an elevated likelihood that one of the upstream nodes in the knowledge graph or in a salient subgraph is also experiencing anomalous behavior that is not necessarily showing up as an alert given the node's threshold settings. The edges of the directed KG provide the opportunity for additional causation insights as node-node relationships flow in a single direction between the nodes. In this embodiment, the system could do any or all of the following: graphically display the behavior of the nearest upstream nodes, allowing an operator to visually determine whether there is an upstream anomaly that may be the disturbance that is causing the anomaly, or may be closer to the origin of the anomaly. Automatically explore the nearest upstream nodes, using statistical models to identify any nodes which are behaving anomalously, and display pertinent details of those anomalous behaviors to the operator. Use trained statistical models to derive likely explanations for the cause of the anomaly from the identified anomalies of upstream (and optionally downstream) nodes plus their properties. And use developed statistical and/or what-if models to derive a set of recommendations for how to ameliorate the anomaly from likely explanations of the cause of the anomaly.

In an embodiment, systems and methods mitigate the detected anomalous behavior by using the causes identified above as input to statistical models developed form historical time-series models which provide outputs of recommended actions to reduce or eliminate the anomalous behaviors. In an embodiment, systems and methods automatically generate work order for the implementation of the recommended actions to reduce/eliminate the behaviors. In this embodiment, Such actions may include inspections of the locale to obtain additional information when insufficient information has been provided for the models to recommend a more specific mitigating action. In an embodiment, a user may be provided with the recommended work orders for review or the recommended actions and to confirm or reject the recommended actions of the proposed work orders.

In an embodiment, once the locality and propagation information of a generated alert are consolidated, systems and methods use this information to generate a workorder with useful content which can aid an operator in mitigating this anomaly, and also be useful in routing the workorder to be assigned to a relevant job role/operator. For example, an anomaly identified in one specific sensor, which does not seem to affect any neighboring nodes or subgraphs, can be considered as simply a malfunctioning sensor. Systems and methods use this information is l in assigning the workorder to a specialist who can attend to rectifying that particular sensor which is malfunctioning. An anomaly propagated to multiple physically neighboring nodes may indicate that the environment contains some harmful/non-optimal conditions causing the anomalous behavior in that physical component or group of components. Systems and methods then generate a recommendation for a site-engineer to take a look at the physical environmental conditions of the nodes which generated high anomaly scores and alerts.

As shown in FIG. 1, computing environment 100 contains an example of an environment for the execution of at least some of the computer code involved in performing the inventive methods, such as system monitoring method software 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible.

Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
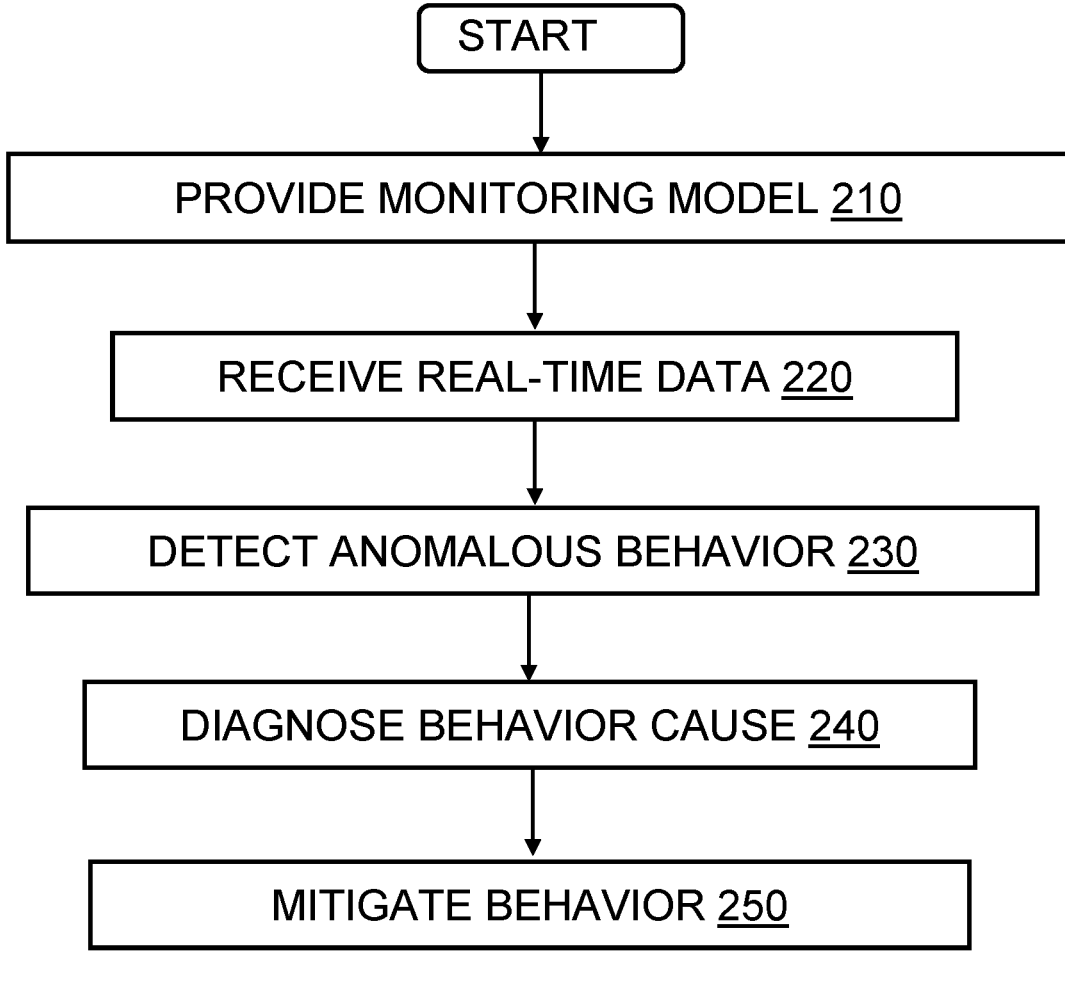
FIG. 2 provides a flowchart depicting an operational sequence, according to an embodiment of the invention.

FIG. 2 provides a flowchart 200, illustrating exemplary activities associated with the practice of the disclosure. After program start, at block 210, the system monitoring method of block 150, provides a machine learning model including a semantic representation of system component relationships and models correlations between component behaviors, such as multi-variate system metrics.

At block 220, the method receives real-time system performance data related to the machine learning model. The method processes the real-time data using the machine learning model.

At block 230, the method detects anomalous system behavior associated with a system node or locale, according to the real-time data and the machine learning model metrics.

At block 240, methods diagnose the anomalous behavior according to the model including identifying causation of the anomalous behavior(s).

At block 250, methods mitigate the anomalous behavior by generating recommended actions and issuing work orders to implement the recommended action.

FIG. 3 depicts a system knowledge graph 300 including nodes 310 and edges 320. Emboldened Nodes 310 and edges 320 indicate salient sub-graphs defined by expert's prescription including the following: a subgraph starts at any node of type "Tool" regardless of subtype. Edges emanating from a node of type "Tool" must be of type "has" and must link to a node of type "Chamber" and sub-type "Main". Edges emanating from a node of type "Chamber" of any type, must link to a node of type Sensor; of any node sub-type. Edges emanating from a node of type "Sensor" must be of type "feeds". They must link to a logical node of type Summary which perform summary calculations (e.g. Max, Avg or Variance at any time scale). Edges emanating from a logical node of type "Summary" must be of type "feeds", and must link to a logical node of type "Threshold". Subgraphs must terminate in a node of type "Threshold". As shown in FIG. 1, this prescription yields two salient sub-graphs. The first flowing from Tool: Litho and the second from Tool: Thin-Film.

EXAMPLES

A change in chamber pressure is detected. The tool's KG includes gas flow and pressure control valve position as known related sensors. Based on the KG, the gas flow and pressure control valve position data are reviewed. If the gas flow has changed, the signal is "confirmed" as something other than merely a sensor problem, and the tool's process recipe must be investigated for an erroneous update. If no change in gas flow and pressure control valve position are observed, the signal is "not confirmed", the sensor itself is suspected, and pressure sensor remediation is suggested.

The KG identifies chamber pressure, gas flow, and pressure control valve data as related sensors and the data from those 3 sensors is fused as an intermediate representation. When an aberration in the intermediate representation is detected, systems and methods know immediately that the source of the signal is not merely an issue with a single sensor per se, and actions beyond the replacement of a single sensor must be considered.

A change in film thickness is detected. The Tool's KG includes relationships between product characteristics and annual tool preventative maintenance work items. The tool maintenance history is reviewed. If the maintenance history indicates recent component replacement, systems and methods order component assessment. If no recent activity is recorded in the tool maintenance history, systems and methods order experiments to confirm the indicated shift in film characteristics are suggested.

It is to be understood that although this disclosure includes a description on cloud computing, implementation of the teachings recited herein are not limited to a cloud computing environment. Rather, embodiments of the present invention are capable of being implemented in conjunction with any other type of computing environment now known or later developed.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of one or more transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
   providing a machine learning model comprising a knowledge graph depicting system entity relationships, and modeling behavioral correlations among system entities according to historical time-series data;
   receiving real-time time-series data for the system according to monitoring frequencies;
   detecting an anomalous system behavior in a system locale, according to the real-time time-series data, the machine learning model, monitoring thresholds and multivariate sensor metrics;
   adjusting the monitoring thresholds, and the monitoring frequencies, according to the system locale, the knowledge graph and the anomalous system behavior;
   diagnosing the anomalous system behavior according to an upstream portion of the knowledge graph and a statistical behavior model for the system locale;
   deriving a recommended action according to the anomalous system behavior; and
   generating a work order to implement the recommended action.

2. The computer implemented method according to claim 1, wherein providing a machine learning model comprising a knowledge graph depicting system entity relationships, and modeling behavioral correlations among system entities according to historical time-series data comprises:
   receiving a representation of physical or logical connectivity of the system and historical time series data recorded by sensors of the system;
   deriving from at least one of the knowledge graph and historical time series data, a multi-variate statistical model of system-level behavior anomalies; and
   deriving from the multi-variate statistical model an indicative set of conditions on multi-variate aggregations of sensors that indicate anomalous behavior.

3. The computer implemented method according to claim 2, further comprising:
   receiving a prescription for or computing salient sub-graphs and applying it to the knowledge graph to produce a set of one or more salient sub-graphs;
   deriving from at least one of the salient sub-graphs and historical time series data, a second multi-variate statistical model of system-level behavior anomalies; and
   deriving from the second multi-variate statistical model an indicative set of conditions on multi-variate aggregations of sensors that indicate anomalous behavior.

4. The computer implemented method according to claim 2, wherein deriving from at least one of the knowledge graph and historical time series data, a multi-variate statistical model of system-level behavior anomalies comprises limiting the knowledge graph to a set of nodes defined by a maximum inter-node distance from each other.

5. The computer implemented method according to claim 2, wherein deriving a multi-variate statistical model comprises inferring causation from directed edges of the knowledge graph.

6. The computer implemented method according to claim 2, wherein deriving a multi-variate statistical model comprises encoding a portion of nodes of the knowledge graph as an intermediate representation.

7. The computer implemented method according to claim 2, wherein deriving a multi-variate statistical model comprises inferring a Bayes net from the knowledge graph.

8. The computer implemented method according to claim 1, further comprising altering an anomalous behavior threshold for a system node selected from a group consisting of nodes upstream of the system locale, nodes downstream of the system locale, and combinations thereof.

9. A computer program product comprising one or more computer readable storage media and collectively stored program instructions on the one or more computer readable storage media, the stored program instructions which, when executed, cause one or more processors to:

provide a machine learning model comprising a knowledge graph depicting system entity relationships, and modeling behavioral correlations among system entities according to historical time-series data;

receive real-time time-series data for the system according to monitoring frequencies;

detect an anomalous system behavior in a system locale, according to the real-time time-series data, the machine learning model, monitoring thresholds, and multivariate sensor metrics;

adjusting the monitoring thresholds, and the monitoring frequencies, according to the system locale, knowledge graph and the anomalous system behavior;

diagnose the anomalous system behavior according to an upstream portion of the knowledge graph and a statistical behavior model for the system locale;

derive a recommended action according to the anomalous system behavior; and generate a work order to implement the recommended action.

10. The computer program product according to claim 9, wherein providing a machine learning model comprises program instructions, which, when executed cause the one or more processors to:

receive a representation of physical or logical connectivity of the system and historical time series data recorded by sensors of the system;

derive from at least one of the knowledge graph and historical time series data, a multi-variate statistical model of system-level behavior anomalies; and derive from the multi-variate statistical model an indicative set of conditions on multi-variate aggregations of sensors that indicate anomalous behavior.

11. The computer program product according to claim 10, the stored program instructions further causing the one or more processors to:

receive a prescription for or computing salient sub-graphs and applying it to the knowledge graph to produce a set of one or more salient sub-graphs;

derive from at least one of the salient sub-graphs and historical time series data, a second multi-variate statistical model of system-level behavior anomalies; and derive from the second multi-variate statistical model an indicative set of conditions on multi-variate aggregations of sensors that indicate anomalous behavior.

12. The computer program product according to claim 10, wherein deriving from at least one of the knowledge graph and historical time series data, a multi-variate statistical model of system-level behavior anomalies comprises limiting the knowledge graph to a set of nodes defined by a maximum inter-node distance from each other.

13. The computer program product according to claim 10, wherein deriving a multi-variate statistical model comprises inferring causation from directed edges of the knowledge graph.

14. The computer program product according to claim 10, wherein deriving a multi-variate statistical model comprises encoding a portion of nodes of the knowledge graph as an intermediate representation.

15. The computer program product according to claim 10, wherein deriving a multi-variate statistical model comprises inferring a Bayes net from the knowledge graph.

16. The computer program product according to claim 9, the stored program instructions further causing the one or more processors to alter an anomalous behavior threshold for a system node selected from a group consisting of nodes upstream of the system locale, nodes downstream of the system locale, and combinations thereof.

17. A computer system comprising:

one or more computer processors;

one or more computer readable storage media; and stored program instructions on the one or more computer readable storage media for execution by the one or more computer processors, the stored program instructions which, when executed, cause the one or more computer processors to:

provide a machine learning model comprising a knowledge graph depicting system entity relationships, and modeling behavioral correlations among system entities according to historical time-series data;

receive real-time time-series data for the system according to monitoring frequencies;

detect an anomalous system behavior in a system locale, according to the real-time time-series data, the machine learning model, monitoring thresholds, and multivariate sensor metrics;

adjusting the monitoring thresholds, and the monitoring frequencies, according to the system locale, knowledge graph and the anomalous system behavior;

diagnose the anomalous system behavior according to an upstream portion of the knowledge graph and a statistical behavior model for the system locale;

derive a recommended action according to the anomalous system behavior; and generate a work order to implement the recommended action.

18. The computer system according to claim 17, wherein providing a machine learning model comprises program instructions, which, when executed cause the one or more processors to:

receive a representation of physical or logical connectivity of the system and historical time series data recorded by sensors of the system;

derive from at least one of the knowledge graph and historical time series data, a multi-variate statistical model of system-level behavior anomalies; and derive from the multi-variate statistical model an indicative set of conditions on multi-variate aggregations of sensors that indicate anomalous behavior.

19. The computer system according to claim 18, the stored program instructions further causing the one or more processors to:

receive a prescription for or computing salient sub-graphs and applying it to the knowledge graph to produce a set of one or more salient sub-graphs;

derive from at least one of the salient sub-graphs and historical time series data, a second multi-variate statistical model of system-level behavior anomalies; and derive from the second multi-variate statistical model an indicative set of conditions on multi-variate aggregations of sensors that indicate anomalous behavior.

20. The computer system according to claim 17, the stored program instructions further causing the one or more processors to alter an anomalous behavior threshold for a system node selected from a group consisting of nodes upstream of the system locale, nodes downstream of the system locale, and combinations thereof.

\* \* \* \* \*